Patented Nov. 6, 1951

2,574,020

UNITED STATES PATENT OFFICE 2,574,020

SHORTSTOPPING AN EMULSION POLYMERIZATION REACTION WITH ALKYL POLYSULFIDE

Willie W. Crouch, Bartlesville, Okla., assignor to Phillips Petroleum Company, a corporation of Delaware No Drawing. Application June 17, 1946, Serial No. 677,396

12 Claims. (Cl. 260—84.3)

This invention relates to the emulsion polymerization of conjugated diolefins. In one of its more specific aspects it relates to the copolymerization of butadiene and another monomer copolymerizable therewith in an aqueous emulsion. This invention also relates to the termination of the polymerization reaction when the desired conversion has been attained by the use of a novel shortstopping agent.

In the production of synthetic elastomers having rubber-like properties the polymerization of conjugated diolefins is frequently carried out in an aqueous emulsion. Emulsion polymerization has been extensively used for the production of GR–S and similar types of synthetic rubber. Usually a butadiene hydrocarbon, for example, 1,3-butadiene, isoprene and 2,3-dimethyl butadiene, and an unsaturated organic monomer copolymerizable therewith in an aqueous emulsion are dispersed in water with the aid of a dispersing agent, such as soap. The polymerization of the butadiene hydrocarbon and the other comonomer is carried out in the presence of an oxidation type catalyst, for example, potassium persulfate, and a suitable modifier, for example, one or more of the higher molecular weight mercaptans.

The polymerization is effected in a pressure vessel provided with means for temperature control and for agitation of the emulsion during the polymerization period. A temperature within the range of from about 80 to about 125° F. is generally employed. The rate of polymerization and the quality of the copolymer produced is influenced to some extent by the reaction temperature. An increase in reaction temperature results in an increase in the rate at which polymerization reaction proceeds; on the other hand, as the temperature is increased the physical properties of the polymer may be adversely affected. Higher temperatures usually result in the formation of undesirable benzene-insoluble gel. In the production of GR–S, temperatures have been standardized at about 50° C. (122° F.). When the desired extent of monomer conversion has been attained, about 75 per cent in the case of GR–S, the resulting emulsion of polymer, known as synthetic latex, is removed from the reaction vessel and processed for removal of unconverted monomer and for recovery of the polymer from the serum.

In such a system it is generally desirable to halt the reaction when a predetermined degree of conversion has been obtained. The termination of the polymerization is referred to as shortstopping and is usually effected by substances known as shortstopping agents which are introduced into the reaction mixture when the desired conversion of monomers to polymers has been reached.

Among the unsaturated organic compounds which are capable of copolymerizing with butadiene hydrocarbons in an aqueous emulsion are: aryl olefins and substituted aryl olefins (e. g., styrene, p-chlorostyrene, p-methoxystyrene, vinyl naphthalene, and the like); alkyl esters of acrylic acids (e. g., methyl acrylate, methyl methacrylate, butyl acrylate, and the like); nitriles of acrylic acids (e. g., acrylonitrile, methacrylonitrile, and the like); vinylidine chloride; vinyl ketones (e. g., methyl vinyl ketones); vinyl ethers; vinyl carbazole; vinyl furan; vinyl pyridine; and the like.

Among the shortstopping agents employed in the past, hydroquinone and sodium sulfide are widely known. However, the employment of these substances in emulsion polymerization reactions leads to many difficulties. Sodium sulfide impregnates the polymer with hydrogen sulfide, thereby rendering it undesirable because of the disagreeable odor. Hydroquinone imparts a brown color to the product which is often undesirable particularly when white or light colored rubbers are to be manufactured. Furthermore the toxic properties of hydroquinone together with its solubility in water gives rise to a serious problem in the disposal of the serum residues after removal of the polymer.

I have now found that compositions comprising mixtures of alkyl polysulfides are effective shortstopping agents for emulsion polymerization reactions, and that when these substances are employed, substantially improved properties are obtained in the polymers produced.

An object of the present invention is to provide an improved process for the polymerization of a conjugated diolefin in an aqueous emulsion. Another object is to provide an improved process for the copolymerization of a butadiene hydrocarbon and an unsaturated organic monomer copolymerizable therewith in aqueous emulsion. Still another object of this invention is to provide improved shortstopping agents or polymerization inhibitors for use in emulsion polymerization of polymerizable organic compounds. A further object is to provide improved high molecular weight polymers from unsaturated organic monomers. A still further object is to provide an improved butadiene-styrene copolymer.

In a conventional technique for the production of GR-S rubber, an emulsion is prepared by suitable agitation of the following recipe:

|  | Parts |
|---|---|
| Butadiene | 75 |
| Styrene | 25 |
| Soap | 5 |
| Potassium persulfate | 0.3 |
| Water | 180 |
| Mercaptan | Variable |

Polymerization is effected at a temperature of 50° C. (122° F.) for approximately twelve hours, or until a conversion of about 75 per cent is obtained. In general, it is not desirable to continue the polymerization much beyond this point, due to the tendency for cross linking between the polymer units and consequent gel formation as the modifying agent is depleted. Also, in the later stages of the reaction, the rate of polymerization is reduced to such a degree that higher conversions may be undesirable from a purely economic viewpoint. Obviously, unreacted monomers are present in the reaction mixture at any time previous to complete conversion. To prevent their continuing interaction beyond a predetermined stage, shortstopping agents are added when it is desired to halt the reaction. The substances employed for this purpose are generally reducing agents and in addition to their shortstopping action, serve as stabilizers by destroying any peroxide-type materials which may be present and which, if permitted to remain, lead to cross linkage and deterioration of the polymer. The shortstopping agents are added to the mixture when the desired degree of conversion has been obtained and to secure their uniform action suitable means must be employed to secure even dispersion throughout the reaction system.

In the method of the present invention, the shortstopping agent comprises a composition of alkyl polysulfides, the said polysulfides containing primary, secondary, or tertiary alkyl groups in the $C_2$ to $C_{16}$ range and including tri-, tetra-, penta- or higher polysulfides or mixtures thereof. In general, lower molecular weight compounds are preferable, say those containing alkyl groups in the $C_2$ to $C_8$ range. Since the said polysulfides are generally insoluble in water, their dispersion may be effected by introducing them as an emulsion in a solution of soap, or other suitable emulsifying agent such as a high molecular weight alkyl sulfate or sulfonate or, if preferred, they may be added as a solution in a suitable hydrocarbon solvent such as, for example, benzene. When introduced in an emulsified form it may be desirable to employ a homogenizing process to secure the most effective dispersion of the polysulfide before addition to the system.

The alkyl polysulfides used as polymerization shortstops in accordance with the present invention may be considered alkyl derivatives of hydrogen sulfide. These compounds may be represented by the general formula: $R-S_x-R$ where R is an alkyl group having at least 2 carbon atoms and $x$ is an integer greater than 2. In general, as stated hereinabove, those alkyl polysulfides in which the alkyl group contains from 2 to 16 carbon atoms, and preferably from 2 to 8 carbon atoms, and the number of sulfur atoms is from 3 to 5 or more, are preferred.

In addition to providing effective shortstopping action, the present invention has the very significant advantage of providing polymers that are substantially snow white. Products prepared in this manner are thus particularly adapted for use in the manufacture of white and light colored synthetic rubbers. A further advantage lies in the fact that the polysulfide compositions employed in my invention are oil-like in nature and are absorbed in the polymer. Thus, even though non-toxic they do not remain in the serum residue for disposal as waste. Furthermore, due to their relatively high sulfur content, their absorption in the polymer may, in some instances, contribute valuable vulcanization characteristics to the rubber produced. A still further advantage of my invention lies in the substantially odor-free polymers produced thereby.

The alkyl polysulfide compositions employed in my invention may be prepared by the addition of sulfur to an alkyl disulfide over a suitable catalyst, or by other conventional procedures known to the art, such as the interaction of mercaptans with sulfur chloride, thionyl chloride with sulfhydryl compounds, and the like. While the sulfur content of the polysulfide compositions will vary over a relatively wide range depending on the chain length of the alkyl groups, I have preferred to operate with mixtures comprising about 40 to 50 weight per cent combined sulfur.

My investigations of the use of alkyl polysulfides as shortstopping agents for emulsion polymerization have shown that the alkyl disulfides are ineffective for this purpose. The alkyl trisulfides and higher alkyl polysulfides are effective as polymerization inhibitors or shortstopping agents in concentrations as low as 0.1 weight per cent of the monomer charged. The alkyl polysulfides employed in the following examples were obtained as by-products from the production of ditertiary butyl disulfide. The ditertiary butyl disulfide was prepared by cautious oxidation of tertiary butyl mercaptan, which in turn, was prepared by the interaction of hydrogen sulfide and isobutylene. In the production of ditertiary butyl disulfide by this process some of the higher polysulfides were also produced. The higher alkyl polysulfides employed in the following examples were obtained as bottom products in the distillation of the alkyl polysulfides, after removal of the ditertiary butyl disulfide. The alkyl polysulfides so-obtained have an average molecular weight of about 211 and contain about 44 weight per cent sulfur. This material is predominantly ditertiary butyl trisulfide, but includes higher alkyl polysulfides as well. Attempted purification of the material by fractional distillation to obtain substantially pure tertiary butyl trisulfide resulted in a breaking down of some of the higher alkyl polysulfides contained therein with the result that the effectiveness as a polymerization inhibitor was somewhat lessened. The following examples are intended to be illustrative only and are not to be construed as in any way limiting the present invention.

*Example I*

A series of four polymerization mixtures was prepared according to the previously presented recipe and allowed to react in bottles at 50° C., and with suitable agitation. After eight hours, bottle 1 was removed and the per cent conversion determined. At the same time the reactions in bottles 2 and 3 were shortstopped with 0.20 part alkyl polysulfide composition emulsified in soap solution (0.20 part polysulfide per 100 parts monomers). Samples 2, 3, and 4 were continued under polymerization conditions until a total time of 15 hours had elapsed. The result of these experiments were as follows:

| Test No. | Total Polymerization | Shortstopping Agent | Shortstopped at— | Per Cent Conversion |
|---|---|---|---|---|
| | Hours | | Hours | |
| 1 | 8 | None | | 52.4 |
| 2 | 15 | 0.2 part polysulfide | 8 | 54.2 |
| 3 | 15 | ----do---- | 8 | 54.3 |
| 4 | 15 | None | | 89.0 |

*Example II*

Two polymerization mixtures were prepared according to the previously presented type and polymerized at 50° C. for 12 hours. They were then shortstopped, one reaction by 0.2 part polysulfide in soap emulsion, the other by 0.2 part hydroquinone. They were then stabilized with a condensation product of isoheptene and beta-naphthylamine, coagulated with brine-acid mixture and the polymer was collected and dried. The polymer produced from the reaction shortstopped with the polysulfide composition was snow white, while that from the reaction shortstopped with hydroquinone was brown in color.

*Example III*

A series of four polymerization mixtures was prepared as in Example I. At the end of eight hours polymerization three of these tests were shortstopped with varying amounts of alkyl polysulfide mixture emulsified in soap while the fourth was maintained as a control. The tests were kept under polymerizing conditions for an additional seven hours, then stabilized with a condensation product of isoheptene and beta-naphthylamine, and coagulated. The following results were obtained:

| Sample Number | Shortstopped at— | Total Polymerization Time | Shortstopping Agent, Parts Used | Per Cent Conversion |
|---|---|---|---|---|
| | Hours | Hours | | |
| 1 | 8 | 15 | 0.1 | 58.9 |
| 2 | 8 | 15 | 0.2 | 58.4 |
| 3 | 8 | 15 | 0.4 | 57.7 |
| 4 | | 15 | | 90.5 |

Since certain changes may be made in carrying out the above process without departing from the scope of the invention, it is intended that all matter contained in the foregoing description of the invention shall be interpreted as illustrative and not in a limiting sense.

I claim:

1. In the emulsion polymerization of butadiene and an unsaturated organic monomer copolymerizable therewith in aqueous emulsion in the presence of an oxidation type catalyst, the improvement which comprises carrying the polymerization to the desired extent, and then arresting polymerization by the addition to the polymerizing mixture of an alkyl polysulfide containing 3 to 5 sulfur atoms per molecule and from 2 to 16 carbon atoms in each alkyl group in an amount equivalent to from about 0.1 to about 0.5 weight per cent of the reactants.

2. A process for the polymerization of butadiene and styrene which comprises forming an aqueous emulsion of butadiene and styrene, carrying out the polymerization of the butadiene and styrene in the presence of an oxidation type catalyst with continuous agitation for a period of time sufficient to effect the desired conversion, and at the end of said polymerization period adding to the resulting emulsion an alkyl polysulfide containing 3 to 5 sulfur atoms per molecule and 2 to 8 carbon atoms in each alkyl group in an amount equivalent to from about 0.1 to about 0.5 weight per cent of the reactants in the original charge.

3. In a process for the manufacture of a synthetic elastomer wherein butadiene and styrene are emulsified in water in the presence of an emulsifying agent and polymerized in the presence of an oxidation-type catalyst at a temperature within the range of from about 80 to about 125° F. with continuous agitation, the step which comprises the addition to a resulting emulsion of an alkyl polysulfide containing 3 to 5 sulfur atoms per molecule and from 2 to 8 carbon atoms in each alkyl group to the polymerization emulsion at the desired point of conversion whereby further polymerization is substantially inhibited.

4. In a process for the polymerization of butadiene and styrene in an aqueous emulsion in the presence of an oxidation type catalyst, the improvement which comprises carrying the polymerization to the desired extent, and arresting polymerization by the addition to a resulting emulsion of an aqueous emulsion of an alkyl polysulfide containing 3 to 5 sulfur atoms per molecule and from 2 to 8 carbon atoms per alkyl group in an amount equivalent to from about 0.1 to about 0.5 weight per cent of the reactants in the original charge.

5. A process for the production of a copolymer of butadiene and styrene which comprises emulsifying 75 parts butadiene and 25 parts styrene in 180 parts water using about 5 parts soap as emulsifying agent and about 0.3 part potassium persulfate as catalyst, carrying out the polymerization of butadiene and styrene in said emulsion for a period of time sufficient to produce the desired copolymer and adding to a resulting emulsion in the form of an aqueous emulsion from about 0.1 to about 0.5 weight per cent of an alkyl polysulfide based on the weight of the reactants charged, said polysulfide containing 3 to 5 sulfur atoms per molecule and from 2 to 8 carbon atoms in each alkyl group.

6. In the emulsion polymerization of butadiene and styrene in the presence of an oxidation type catalyst, the improvement which comprises the addition of ditertiary butyl trisulfide to the emulsion after the polymerization reaction has progressed to the desired stage.

7. In a process for the production of a copolymer of butadiene and styrene which comprises emulsifying 75 parts butadiene and 25 parts styrene in 180 parts water using about 5 parts soap as emulsifying agent and about 0.3 part potassium persulfate as catalyst, the improvement which comprises carrying out the polymerization of butadiene and styrene in said emulsion for a period of time sufficient to produce a desired copolymer, and stopping the polymerization reaction by adding to a resulting emulsion from 0.1 to 0.5 weight per cent of ditertiary butyl trisulfide based on the weight of the reactants charged.

8. In a process for the production of synthetic rubber by polymerization in an aqueous emulsion of a conjugated diolefin in the presence of a soap as emulsifying agent and in the presence of an oxidation type polymerization catalyst, the improvement which comprises continuing the polymerization for a time sufficient to produce a desired polymer and less than that necessary to effect complete polymerization of said conjugated diolefin, and stopping the polymerization reaction by adding to a resulting emulsion from 0.1 to 0.5 weight per cent of an alkyl polysulfide containing three to five sulphur atoms per molecule and from 2 to 8 carbon atoms in each alkyl group to the reacting mixture.

9. In a process for the production of synthetic rubber by polymerization in an aqueous emulsion of a conjugated diolefin in the presence of a soap as emulsifying agent and in the presence of an oxidation type polymerization catalyst, the improvement which comprises continuing the polymerization for a time sufficient to produce a desired polymer and less than that necessary to effect complete polymerization of said conjugated diolefin, and stopping the polymerization reaction by adding to a resulting emulsion a ditertiary butyl polysulfide composition comprising compounds containing 3 to 5 sulfur atoms per molecule, said composition being added in an amount between 0.1 and 0.5 weight per cent of the reactants in the original charge.

10. A process for the production of a copolymer of butadiene and styrene which comprises emulsifying 75 parts butadiene and 25 parts styrene in 180 parts water using about 5 parts soap as emulsifying agent and about 0.3 part potassium persulfate as catalyst, carrying out the polymerization of butadiene and styrene in said emulsion for a period of time sufficient to produce the desired copolymer and adding to a resulting emulsion in the form of an aqueous emulsion from 0.1 to 0.4 weight per cent of a mixture of ditertiary butyl polysulfides having an average molecular weight of 211 and containing 44 per cent by weight sulfur and obtained as a kettle residue in the removal by distillation of ditertiary butyl disulfide and lighter material from a reaction product of the oxidation of tertiary butyl mercaptan to ditertiary butyl polysulfides.

11. In the emulsion polymerization of a conjugated diolefin in the presence of an oxidation type catalyst, the improvement which comprises the addition of a ditertiary butyl polysulfide composition comprising compounds containing three to five sulfur atoms per molecule to the emulsion after the polymerization reaction has progressed to the desired stage.

12. In the emulsion polymerization of a conjugated diolefin in the presence of an oxidation type catalyst, the improvement which comprises the addition of a dialkyl polysulfide composition comprising compounds containing three to five sulfur atoms per molecule and from two to eight carbon atoms in each alkyl group to the emulsion after the polymerization reaction has progressed to the desired stage.

WILLIE W. CROUCH.

REFERENCES CITED

The following references are of record in the file of this patent:

UNITED STATES PATENTS

| Number | Name | Date |
| --- | --- | --- |
| 2,366,313 | Browning | Jan. 2, 1945 |
| 2,388,477 | Fryling | Nov. 6, 1945 |